(No Model.)
J. W. DOWLING.
TOBACCO PIPE.
No. 403,581. Patented May 21, 1889.
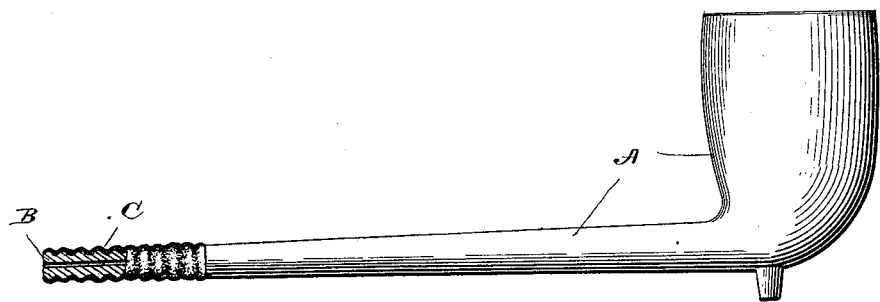

UNITED STATES PATENT OFFICE.

JOHN W. DOWLING, OF NEW YORK, N. Y.

TOBACCO-PIPE.

SPECIFICATION forming part of Letters Patent No. 403,581, dated May 21, 1889.

Application filed February 5, 1889. Serial No. 298,699. (No model.)

*To all whom it may concern:*

Be it known that I, JOHN W. DOWLING, a resident of New York city, in the county of New York and State of New York, have invented certain new and useful Improvements in Tobacco-Pipes; and I do hereby declare the following to be a full, clear, and exact description of the invention, such as will enable others skilled in the art to which it pertains to make and use the same.

My invention relates to an improvement in tobacco-pipes; and it consists in a pipe having its stem provided with a series of circumferential swells or beads and a soft yielding tubular rubber tip slipped over the said stem, whereby similarly-shaped circumferential swells or beads are imparted to the tip and the latter is retained firmly on the stem, as will be hereinafter more fully described and claimed.

The accompanying drawing is a side elevation of a pipe embodying my improvements, a portion of the stem being shown in section, and the sleeve or tip being also shown in section arranged in position on the stem.

The pipe A, which may be made of clay, brier-wood, or other suitable material, is of the usual form, excepting that its stem is provided at its outer end and for a suitable distance therefrom with a series of annular circumferential swells or beads, B.

A cylindrical tip or sleeve, C, which is made of soft flexible rubber, is slipped over that portion of the pipe-stem provided with the swells or beads, and thereby the said swells or beads serve to impart similarly-shaped corrugations to the rubber tip or sleeve. This sleeve or tip retains itself firmly on the stem by contraction thereon and frictional contact therewith, and is of advantage, inasmuch as it prevents the nicotine which may be absorbed by the stem from passing into the mouth of the smoker. Another advantage is that the said tip or sleeve gives the pipe-stem a soft yielding surface, which enables it to be more readily retained in the mouth of the smoker without the necessity of clamping his teeth firmly thereon, and hence without injuring the teeth of the smoker, thereby removing an objection to pipes having hard inflexible stems.

The rubber tip or sleeve being a non-conductor, the heat carried to the stem within the rubber is prevented from going to and injuring the lips and tongue of the smoker, this heat, with the hardness of the ordinary stem, being one of the most common causes of cancer of the lip and tongue.

Having thus described my invention, I claim—

As a new article of manufacture, the pipe having its stem provided with the series of circumferential swells or beads B, and the soft yielding rubber tip slipped over the said stem, whereby similarly-shaped circumferential swells or beads are imparted to the tip and the latter is retained firmly on the stem, substantially as described.

In testimony whereof I have signed this specification in the presence of two subscribing witnesses.

JOHN W. DOWLING.

Witnesses:
  A. E. THATCHER,
  HENRY SIMONS.